(12) United States Patent
Mears (10) Patent No.: US 11,022,473 B2
(45) Date of Patent: Jun. 1, 2021

(54) CALIBRATION-FREE CONTINUOUS BIN LEVEL SENSOR

(71) Applicant: DICKEY-JOHN CORPORATION, Shoreview, MN (US)

(72) Inventor: Barry C. Mears, Auburn, IL (US)

(73) Assignee: DICKEY-JOHN CORPORATION, Shoreview, MN (US)

(*) Notice: Subject to any disclaimer, the term of this patent is extended or adjusted under 35 U.S.C. 154(b) by 0 days.

(21) Appl. No.: 16/994,773

(22) Filed: Aug. 17, 2020

(65) Prior Publication Data

US 2020/0378816 A1  Dec. 3, 2020

Related U.S. Application Data

(62) Division of application No. 15/800,972, filed on Nov. 1, 2017, now Pat. No. 10,746,584, which is a division of application No. 14/265,957, filed on Apr. 30, 2014, now Pat. No. 9,810,567.

(60) Provisional application No. 61/819,373, filed on May 3, 2013.

(51) Int. Cl.
*G01F 23/26* (2006.01)
*G01F 23/00* (2006.01)

(52) U.S. Cl.
CPC ........ *G01F 23/266* (2013.01); *G01F 23/0069* (2013.01)

(58) Field of Classification Search
CPC ........................... G01F 23/266; G01F 23/0069
USPC ....................................................... 73/304 C
See application file for complete search history.

(56) References Cited

U.S. PATENT DOCUMENTS

| | | | |
|---|---|---|---|
| 4,296,630 A | 10/1981 | Jung et al. | |
| 4,470,300 A | 9/1984 | Kobayashi | |
| 4,485,673 A * | 12/1984 | Stern | G01F 23/266 |
| | | | 340/870.16 |
| 4,590,575 A * | 5/1986 | Emplit | G01F 25/0061 |
| | | | 702/52 |
| 4,594,893 A | 6/1986 | Lombard et al. | |
| 4,674,329 A | 6/1987 | Mulder | |
| 4,947,689 A | 8/1990 | Hochstein | |
| 5,051,921 A | 9/1991 | Paglione | |
| 5,540,086 A | 7/1996 | Park et al. | |
| 5,602,540 A | 2/1997 | Spillman, Jr. | |

(Continued)

FOREIGN PATENT DOCUMENTS

JP  2012095996 A1  7/2012

OTHER PUBLICATIONS

SensorTechnics, "Liquid level sensors and switches," http://www.sensortechnics.com/en/products/liquid-level-sensors-and-switches/index.html, printed Nov. 25, 2014, 1 page.

*Primary Examiner* — Marrit Eyassu
(74) *Attorney, Agent, or Firm* — Kagan Binder, PLLC (57) ABSTRACT

A sensor assembly is described herein that can automatically calibrate itself upon installation into an empty bin, eliminating the need to actually fill the bin to calibrate the level reading. The sensor will provide consistent measurement regardless of material properties (permittivity, density, temperature or moisture content). The capacitive nature of the sensor means that in some circumstances, it will sense the material through plastic/glass/fiber glass thereby allowing the sensor assembly to be mountable on the outside of a bin or container. The electrodes of the sensor system are designed to provide a continuous level reading.

8 Claims, 8 Drawing Sheets

(56) References Cited

U.S. PATENT DOCUMENTS

| | | |
|---|---|---|
| 5,900,810 A | 5/1999 | Park et al. |
| 6,101,873 A | 8/2000 | Kawakatsu et al. |
| 6,539,797 B2 * | 4/2003 | Livingston ............ G01F 23/266 73/290 R |
| 6,545,603 B1 | 4/2003 | Launay et al. |
| 7,421,896 B2 | 9/2008 | Vanderzee |
| 8,181,516 B2 | 5/2012 | Naydenov |
| 8,590,375 B2 | 11/2013 | Farmanyan |
| 9,810,567 B2 | 11/2017 | Mears |
| 2004/0187570 A1 | 9/2004 | Williamson |
| 2006/0236275 A1 | 10/2006 | Groos |
| 2007/0216424 A1 | 9/2007 | Sieh et al. |
| 2008/0042658 A1 * | 2/2008 | Getman ................ G01F 23/266 324/601 |
| 2009/0133491 A1 | 5/2009 | Lee |

\* cited by examiner

CALIBRATION-FREE CONTINUOUS BIN LEVEL SENSOR

CLAIM OF PRIORITY

This application is a divisional of non-provisional Patent Application Ser. No. 15/800,972, filed Nov. 1, 2017, which is a divisional of non-provisional Patent Application Ser. No. 14/265,957, filed Apr. 30, 2014, now U.S. Pat. No. 9,810,567, which claims priority to and the benefit of U.S. Provisional Patent Application No. 61/819,373, filed May 3, 2013 and titled "CALIBRATION-FREE CONTINUOUS BIN LEVEL SENSOR" all of which are incorporated herein by reference in their entireties for all purposes.

FIELD OF THE INVENTION

This invention generally relates to sensors and sensing systems for measuring material fill levels in containers.

BACKGROUND OF THE INVENTION

Capacitive sensors are used extensively for level measurement and proximity detection. A conventional capacitive sensor, which includes one or more conductive plates, is sensitive to changes in the dielectric constants of materials or fluids near or surrounding the plates. The capacitive sensor detects the presence or lack of material in the vicinity of the plates by measuring the capacitance between the plates, which is proportional to the dielectric constant of the material filling the space between the plates. By measuring this capacitance, the quantity of material (for level measurement) or the existence of the material (for proximity detection) may be determined. Similarly, another conventional form of capacitive sensor, which uses linear electrodes, e.g., a long wire or strip immersed into a tank or storage bin holding a variable level of fluid or material, measures the level of the fluid or material by sensing and measuring the capacitance of the linear electrodes.

The accuracy of conventional capacitive sensors is based in large part on the dielectric constant of the material to be sensed. For example, when sensing capacitance, a fifty percent change in relative permittivity (the dielectric constant) causes a corresponding fifty percent change in the measured capacitance, i.e., the relationship is linear. Designing and producing capacitive sensors is therefore hampered by the sensitivity of conventional capacitive sensors to changes in the dielectric constant of the material to be sensed. One continuous capacitive level sensing system is the CLC series offered by SensorTechnics (www.sensortechnics.com) which appears to estimate a fill level of a container based on knowledge of the material being measured. If the material changes, however the sensor may require recalibration.

In U.S. Pat. No. 6,539,797 to Livingston et al, there appears to be disclosed a two electrode sensor embodiment wherein one is fully immersed and one partially immersed to measure material level independent of the dielectric constant of the material. It appears however that the measurements are processed in a more complex manner and calibration measurements are more numerous than the various embodiments disclosed herein.

There is a need for fill level sensing devices for containers that are independent of permittivity, easy to use, and require minimal to no calibration.

SUMMARY OF THE INVENTION

In one example embodiment, a capacitance based level sensor is provided that automatically adjusts for the permittivity of the material being measured, such that it will function equally well for bulk materials such as grain and seed as well as liquids such as fertilizers, pesticides, oil and gasoline. The sensor will function without additional adjustment even if the material being sensed changes, such as a change from corn to soybeans, for example. In related embodiments, dry materials such as salt, sand, dirt, dry fertilizers, pesticides and herbicides are also measurable in containers.

In this example embodiment, the sensor system or assembly described herein can automatically calibrate itself upon installation into an empty bin, eliminating the need to actually fill the bin to calibrate the level reading. The sensor will provide consistent measurement regardless of material properties (permittivity, density, temperature or moisture content). The capacitive nature of the sensor means that in some circumstances, it will sense the material through plastic/glass/fiber glass thereby allowing the sensor assembly to be mountable on the outside of a bin or container. The same sensor assembly is configurable so as to function with bins or containers of different heights from inches to 10's of feet. The electrodes of the sensor system are designed to provide a continuous level reading.

Further, the sensor systems described herein circumvent the need to know exactly what type of material is in a container by making a dual capacitance measurement. This has at least three significant advantages over existing sensors: 1) it eliminates the need to calibrate the sensor for the material being measured; 2) it enables the sensor to self-calibrate at empty and full levels, eliminating the need to actually fill the bin with material to calibrate fill levels; and 3) it enables the same electrical hardware to function with electrodes of various lengths, maximizing installation flexibility.

In a related embodiment, an active shield can be used to protect an externally mounted sensor from being influenced by rain or other weather elements. In related embodiments, the sensor systems described herein are configurable to provide: automatic material calibration, self-calibrating level measurement or measurement of liquid levels.

In a related embodiment, the need for pre-installation into an empty cell can be eliminated which in turn removes the empty bin self-calibration step. This totally calibration-free sensor mode is accomplished by making each of the two capacitance measurements at two frequencies. This means that the sensor assembly can be installed into a partially filled bin, a significant advantage for retrofit installations.

In one example embodiment, a single frequency sensor system is provided herein for measuring a fill level of material in a container that is, but is not limited to, a) material independent; b) frequency independent; c) functions with unknown but constant electrode capacitance; d) functions with arbitrary but known electrode lengths; e) only requires a single empty bin calibration measurement during installation; f) is independent of measurement frequency drift; and g) is independent of parasitic capacitance level.

In another example embodiment, a multi-frequency sensor system for measuring a fill level of material in a container is provided that has the attributes of the single frequency sensor with the exception that it requires no calibration whatsoever as long as the material being measured has a frequency dependent permittivity.

In another example embodiment, the empty bin calibration constants can be determined from multi-frequency measurements at two distinct bin levels and stored for later use with materials that have frequency independent permittivity, thus necessitating use of a single frequency level determination. The benefit of this approach is that no physical calibration steps are required to find the constants.

In yet another example embodiment, a multi-frequency method for calculating a level of fluid or material contained within a container or vessel is provided that includes providing a sensing capacitive element configured from two parallel sensing electrodes positioned adjacent the container or vessel such that changes in a material level cause a proportionate change in a first capacitance of the sensing electrodes, wherein said sensing electrodes have a length LL and a nominal capacitance per unit length $C_0$, and wherein the capacitance of said sensing capacitive element varies in accordance both with the extent of the immersion of the parallel electrode in the fluid or material and a dielectric constant of the fluid or material. In addition, a reference capacitive element is provided that is configured from two parallel reference electrodes positioned adjacent to a bottom of the container or vessel, the reference electrodes having a length LR and a capacitance per unit length $C_0$, wherein the reference electrodes are adapted to be in contact with the material or fluid within the container, and wherein the capacitance of the reference electrodes is a function of the dielectric constant of the fluid or material. Further, a measured capacitance is determined of the sensing capacitive element at a first frequency (f1) and at a second frequency (f2) and a measured capacitance is determined of the reference capacitive element at the first frequency (f1) and at the second frequency (f2). A level of the fluid or material within the container is generated from a product of:

a ratio of $L_R$ (reference electrode length) and $L_L$ (sensing electrode length) and a ratio of:

a. a difference of the measured capacitance of the sensing element at the first frequency and the measured capacitance of the sensing element at the second frequency as a numerator;

b. a difference of the measured capacitance of the reference element at the first frequency and the measured capacitance of the reference element at the second frequency as a denominator.

The various embodiments described herein will now be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

Other important objects and advantages of the present invention will be apparent from the following detailed description of the invention taken in connection with the accompanying drawings in which.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

Figure 1:
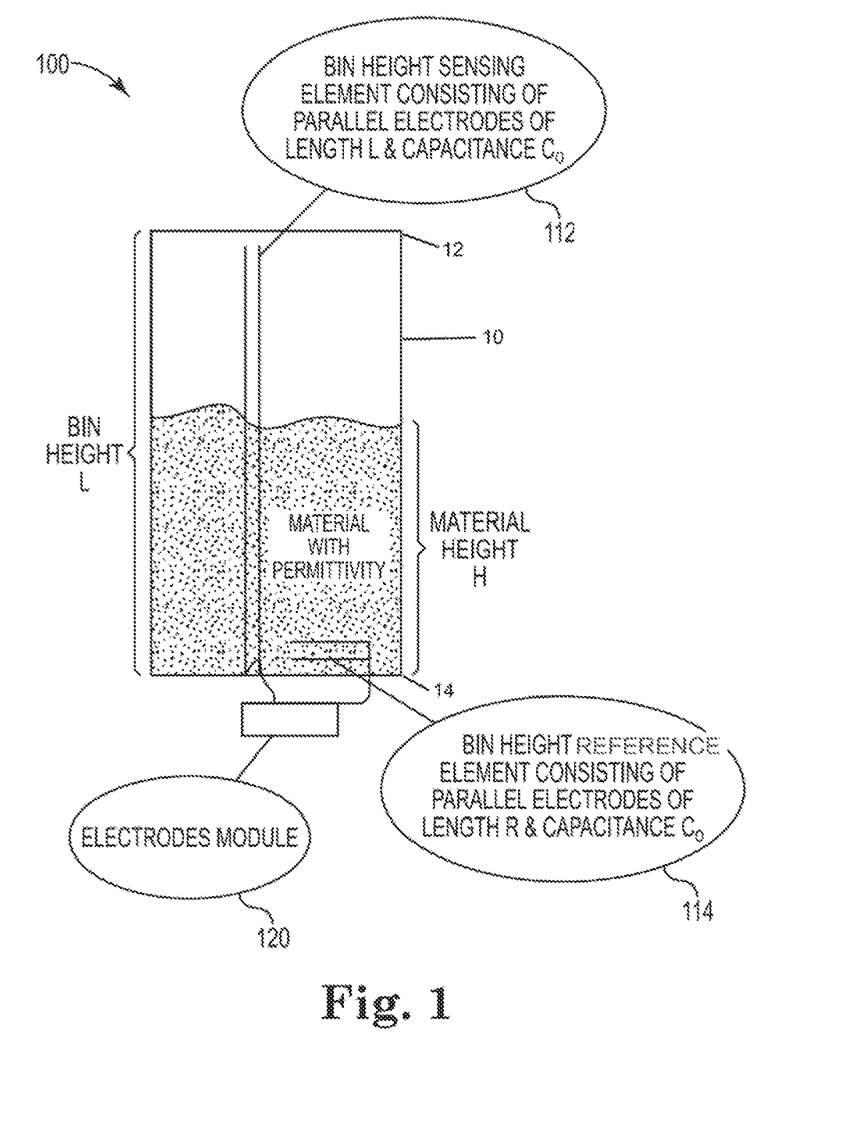
FIG. 1 illustrates an example embodiment of a two sensing element system for bin level measurement according to the teachings herein.
Figure 2:
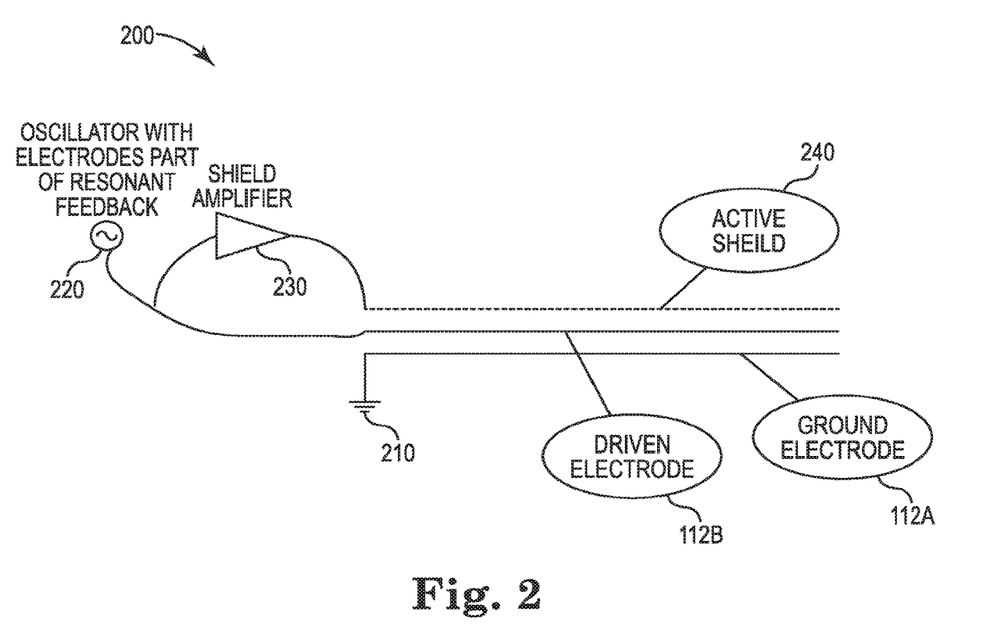
FIG. 2 illustrates in an example embodiment of an active shield for a bin or tank level sensor as taught herein.
Figure 5:
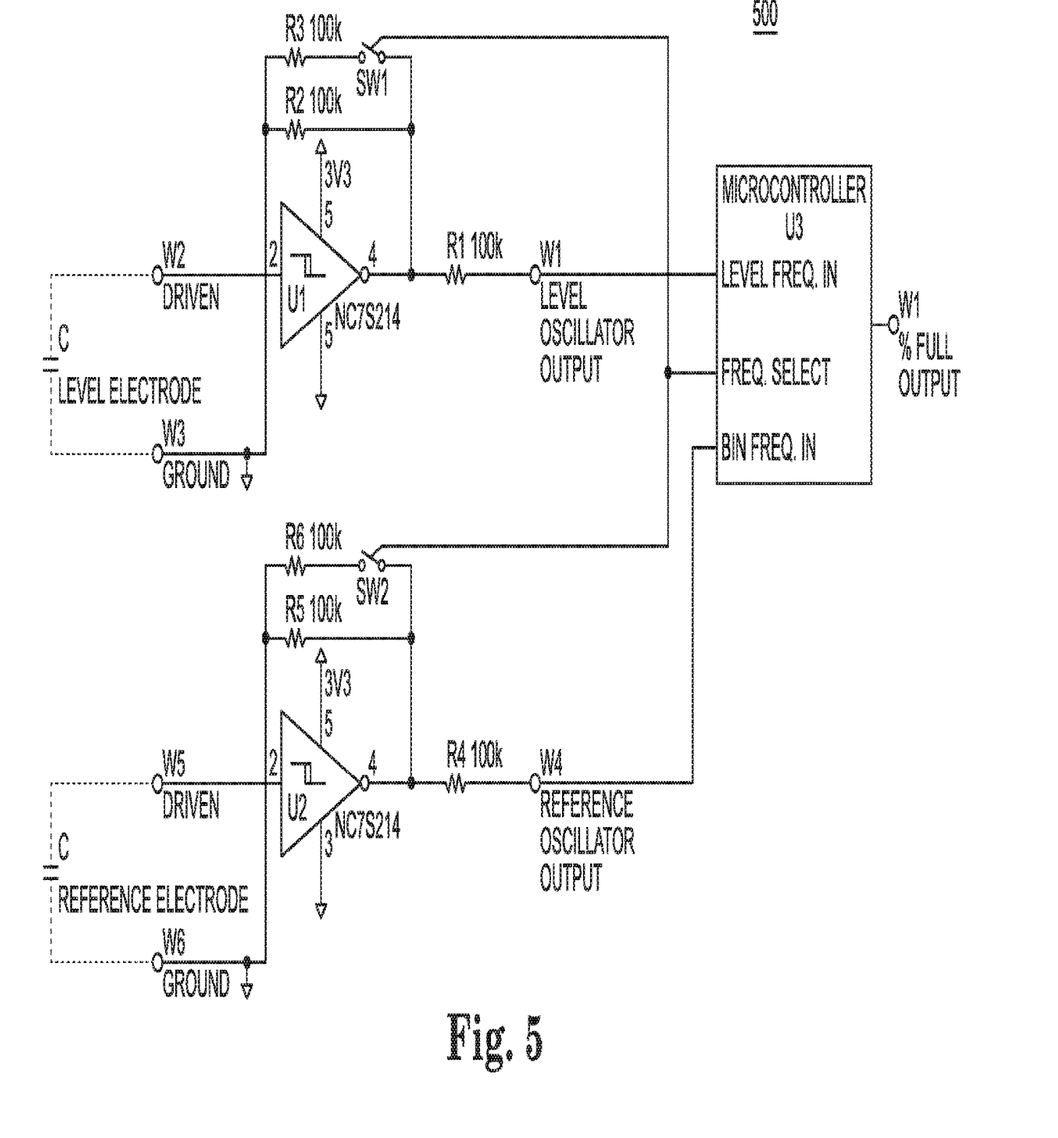
FIG. 5 illustrates a schematic a frequency generating circuit and processing means for a multi-frequency sensor as taught herein.

Referring now to the Figures, in particular to FIGS. 1, 2 and 5, in one example embodiment, a sensor system or assembly 100 for use on a bin or container 10 consists of two sensing elements 112 and 114, an electronics module 120 and an optional shield material (not shown) (in this example, a metal tape). A first sensing element 112 is a bin level element that is configured to be long enough to span from a top 12 to a bottom 14 of bin 10. A second sensing element 114 is a reference element that is for a reference measurement and should preferably be mounted at bottom 14 of bin 10 so that it will normally be fully exposed to the material being measured. In this example embodiment, sensing elements 112 and 114 each consist of a length of jacketed parallel conductors (such as twin lead radio wire).

In other related embodiments, the sensing elements are mountable internally or, in the case of plastic, glass, or fiberglass bins, the sensing elements or leads or electrodes may be mounted externally. External mounting for outdoor applications suggests that the sensing elements be covered by metal tape, which is driven by electronics module 120, to serve as an active shield.

In this example embodiment, electronics module 120 measures the capacitance of the two sensing elements 112 and 114. The electrodes serving as a relaxation oscillator timing capacitor circuit that operates such that the oscillator frequency is a function of the electrode capacitance. In a related embodiment, a circuit drives the electrodes with a constant frequency and uses the output of an impedance divider or bridge to estimate the capacitance. A schematic diagram of an example embodiment of a frequency generating circuit 500 and processing means for a multi-frequency sensor is shown in FIG. 5. The reference and bin level sense electrodes are each driven by a Schmitt Trigger based astable oscillator. The frequency of oscillation is inversely proportional to the product of the feedback resistance and the electrode capacitance. The frequency of the oscillators can be controlled by changing the feedback resistance in the Schmitt Trigger which can be accomplished with a processor controller. For the oscillators shown in the schematic, $$f(\text{kHz}) = \frac{9.5592 \cdot 10^8}{R_{feedback}(\text{kOhm}) \cdot C_{electrode}(\text{pF})}$$

where $R_{feedback}$ is the total feedback resistance (the parallel resistance when the frequency select switch is closed). $C_{electrode}$ includes capacitance associated with the material in the bin or container plus any constant parasitic capacitance. The frequency select switches decrease the resistance by about a factor of 10 over the open switch resistance which in turn increases the oscillation frequency by a factor of 10. The values shown lead to oscillation frequency of 400 kHz when the switch is open and 4 MHz when the switch is closed when the electrode capacitance is about 20 pF. The processor monitors the frequency of oscillation and can thereby calculate the electrode capacitance. The processor performs the appropriate algebraic steps to determine the bin level and outputs that result in the form of PWM duty cycle, frequency, analog voltage, or digital value.

In situations where electrodes are mounted on the exterior of the bin, active shielding may be required to prevent unwanted bias in the capacitance measurements by external influences such as rain and nearby material. A partial electric circuit 200 describing the active shielding of sensor system 100 is shown in FIG. 2. In this example electric circuit 200, one electrode from each sensing element 112A (or 114A (not shown)) is held at electrical ground 210 and the other active electrode 112B (or 114B (not shown)) is driven at some frequency by the measurement circuit, which in this example is an oscillator 220 and amplifier combination 230. Included in the electronics is an amplifier for each active electrode that follows the signal driving that particular active electrode. This signal is applied to a shield tape member 240 that is placed over the sensing electrodes in external bin outdoor mounting applications.

Referring again to FIG. 1, in normal operation, bin level sensing element 114 is partially buried (or covered) in some bulk material or partially submerged in a liquid. For FIG. 1, the following parameters in this example embodiment are defined as follows:

$C_0$ is sensing element capacitance per unit length (11.8 pF/m for 300 twin lead)

L is the length of the sensing element in meters (m)

R is the length of the reference element in meters

H is the height of the material in the bin in meters (unknown)

The bin level can be expressed as a percentage of the total electrode length L:

$$\text{bin level} = \frac{(C_{tot} - C_{tot_{empty}})}{(C_{ref} - C_{ref_{empty}})} \cdot \frac{R}{L} \cdot 100\%$$

$C_{tot}$ is the total capacitance of the bin level sensing element (measured)

$C_{ref}$ is the total capacitance of the reference sensing element (measured)

$C_{tot_{empty}}$ is the capacitance of the bin level sensing element when the bin is completely empty (measured during installation)

$C_{ref_{empty}}$ is the capacitance of the reference sensing element when the bin is completely empty (measured during installation)

Significant in this expression for calculating or measuring the bin level is that all of the physical parameters are eliminated: 1) the bin sensing element length L can be arbitrary from installation to installation; 2) the reference sensing element length R can be arbitrary; 3) the nominal capacitance of the sensing elements $C_0$ can be unknown; and 4) the material permittivity $\varepsilon'$ can be unknown. The fact that the material permittivity can be unknown further implies that: a) the material density can be unknown; b) the material temperature can be unknown; c) the material moisture level can be unknown; and d) the measurement frequency can be unknown.

In various embodiments, some of the sensor systems described herein are configured to determine the bin level as long as an empty bin measurement of the capacitance is made of the two sensing elements during sensor installation. The empty measurements can be made without any material in the bin, but this only needs be done once. In normal operation, the reference sensing element is assumed to be fully exposed to the material in the bin, meaning it is best mounted at the bottom of the bin. The electrical measurements used to determine bin level can easily be biased by parasitic contributions to capacitance. Hence, additions to the overall capacitance measurement due to wiring, circuitry, installation, etc., are not influenced by the permittivity of the material in the bin. The various measurement methods developed for bin level minimize the parasitic contributions through the differences of the measured capacitance in the numerator and denominator, effectively canceling out parasitic contributions to the measurement.

In a related embodiment, the need for calibration measurements of any type (including the empty bin measurement during installation) can be eliminated entirely, making this a calibration free sensor. This is accomplished by making capacitance measurements of the level sensing and reference electrodes at two frequencies, nominally about 100 kHz and about 1 MHz, resulting in the following expression for the bin level:

$$\text{bin level} = \frac{(C_{tot_{f_1}} - C_{tot_{f_2}})}{(C_{ref_{f_1}} - C_{ref_{f_2}})} \cdot \frac{R}{L} \cdot 100\%$$

$C_{tot_{f_1}}$ is the measured capacitance of the bin level sensing element taken at frequency f1

$C_{tot_{f_2}}$ is the measured capacitance of the bin level sensing element taken at frequency f2

$C_{ref_{f_1}}$ is the measured capacitance of the reference level sensing element taken at frequency f1

$C_{ref_{f_2}}$ is the measured capacitance of the reference level sensing element taken at frequency f2

All four measurements are taken at the time of the level measurement meaning there is no separate set of calibration measurements. Furthermore, all of the properties of the single frequency bin level method (and mathematical expression) remain intact: 1) the level sensor requires no calibration; 2) the level sensor is material independent, requiring no knowledge of material permittivity; 3) the level sensor is frequency independent, requiring no knowledge of the measurement frequencies which in turn means that the frequencies can drift over time without affecting the level measurement; 4) no knowledge of the electrode capacitance $C_0$ is required, the only requirement being that the capacitance per unit length be constant; and 5) the electrode lengths R and L can be arbitrary in size but their values must be known.

Substantially accurate application of the two frequency bin level method as taught herein depends on the permittivity of the sensed material varying with frequency. This generally is not a problem for hygroscopic materials such as grain but for some materials, like glass, this will present a challenge. For constant permittivity materials, it is preferable to utilize one of the single frequency methods as taught herein for bin level with its requirement of a single empty bin calibration measurement.

The need for calibration can also be eliminated for the single frequency constant permittivity scenario if the multi-frequency approach can first be applied to material that has frequency dependent permittivity. In this case, the empty container calibration constants $C_{tot_{empty}}$ and $C_{ref_{empty}}$ can be determined algebraically from bin level measurements computed using the multi-frequency method. These levels, H1/L and H2/L can then be combined with the capacitance measurements at the two levels to determine the empty container capacitance values as follows:

$$C_{ref_{empty}} = \frac{(C_{tot@H1} - C_{tot@H2}) - \frac{H_1}{R} \cdot C_{ref@H1} + \frac{H_2}{R} \cdot C_{ref@H2}}{\left(\frac{H_2 - H_1}{R}\right)}$$

$$C_{tot_{empty}} = C_{tot@H1} + \frac{H_1}{R} \cdot (C_{ref_{empty}} - C_{ref@H1})$$

In both expressions, the '@H1' and '@H2' refer to previously defined capacitance measurements $C_{tot}$ and $C_{ref}$ made at fill levels H1 and H2 respectively. The levels will preferably differ from one another by about 10% to about 25%. The frequencies of measurement for each fill level are not required to be the same.

The benefits of using two frequencies to determine the single frequency calibration constants are that it is not necessary to perform a physical calibration measurement and the resulting calibration constants can be updated continuously, thus accounting for shifts in parasitic capacitance. When constant permittivity material is encountered, the sensor assembly can automatically shift to a single frequency calculation using the most recent calibration values. During single frequency operation, the calibration values cannot be updated.

Figure 3:
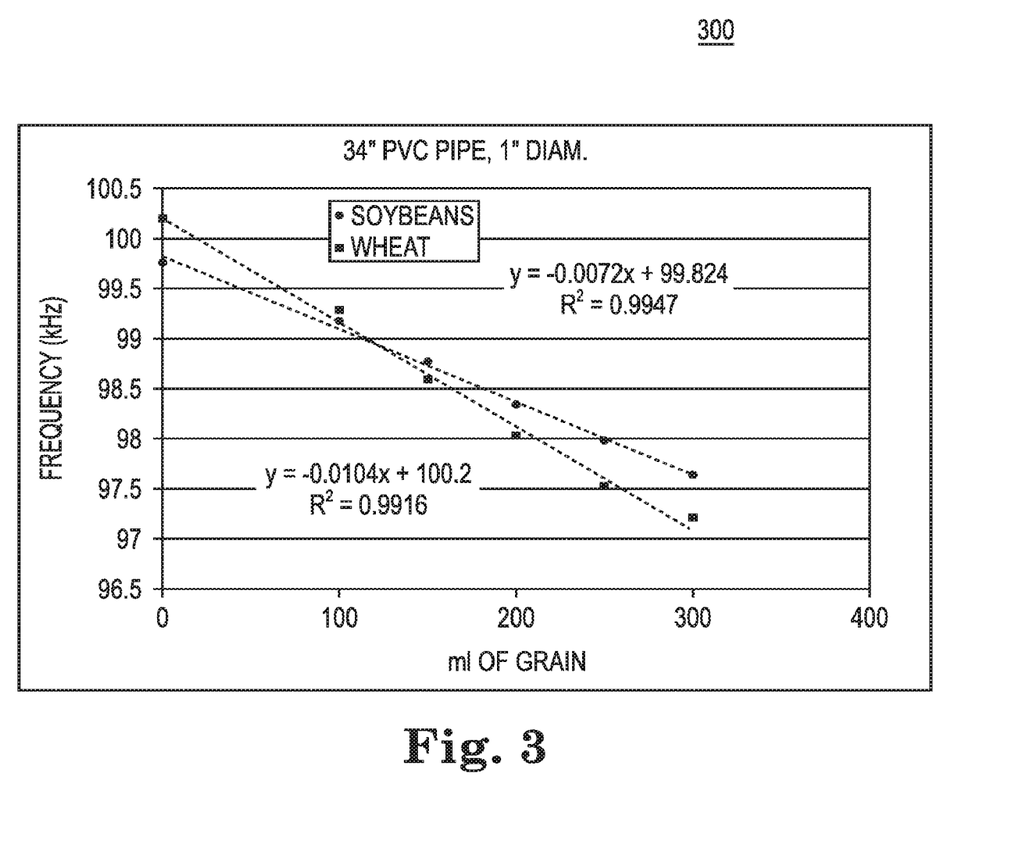
FIG. 3 illustrates a chart of an example bin level measurement of a PVC pipe arrangement using soybean and wheat as taught herein.

Referring now to FIG. 3 there is illustrated a graph 300 of data gathered of an example bin level measurement of a PVC pipe arrangement using soybean and wheat as taught herein. The sensor system was also tested on salt. The grain level test consisted of taping the twin lead to the outside of a 34 inch long and one inch diameter PVC (plastic) pipe. The pipe was filled with either soybean or wheat grain and the effect of the capacitance change on an oscillator frequency was recorded, with the oscillator frequencies ranging from about 97 KHz to about 100.5 KHz. The plot shows the performance of sensor assembly 100 on both wheat and soybeans. The horizontal axis is approximately 10ths of an inch of grain height. In this example embodiment, the grain level was sensed through the plastic pipe; hence a sensor attached to the outside (or inside) of a plastic grain tank is operative. As shown, the different grains have different slopes on the curves. Because this is a capacitance sensor, different materials will read differently, but the bin level calculation will still be "measured material" independent. Further, the moisture level of a fill material may normally affect the reading, however the permittivity independence of the sensor assembly taught herein means this should not affect the bin level measurement.

Figure 4:
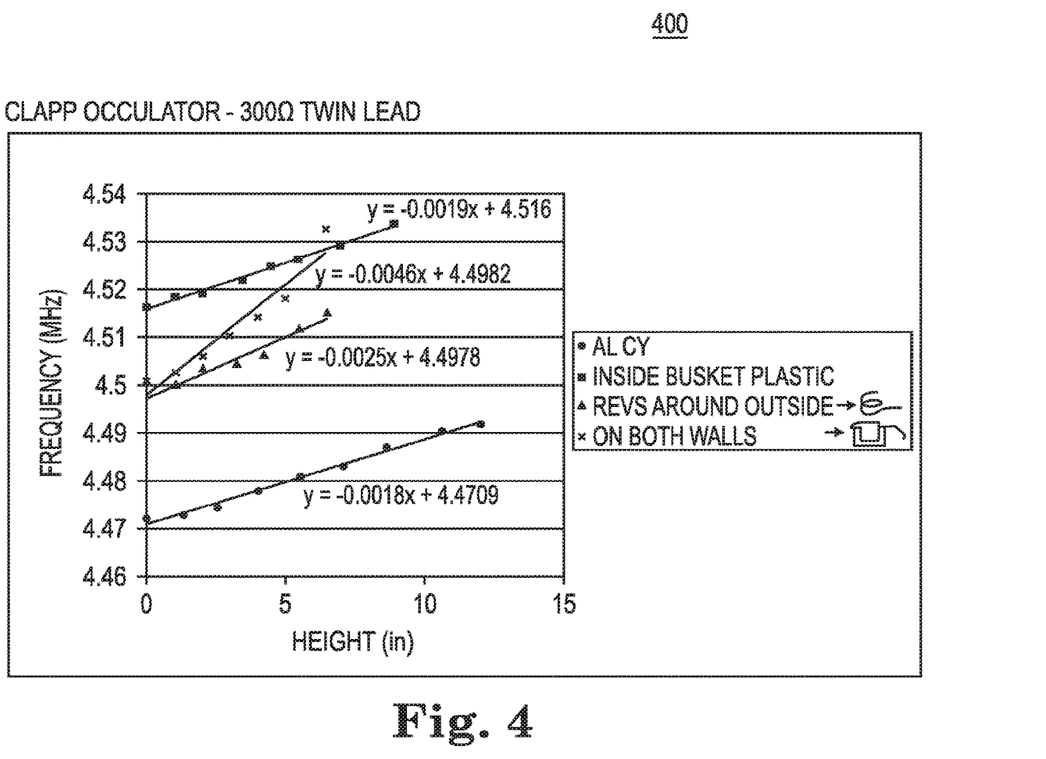
FIG. 4 illustrates a chart of various example bin level measurements using various example sensor arrangements as taught herein.

Referring now to FIG. 4 there is illustrated a graph 400 of various example bin level measurements using various example sensor arrangements as taught herein. In these example embodiments, a Clapp oscillator with a 300 ohm twin lead was used. Frequency (vertical axis) was plotted against the container height (in inches—horizontal axis) for: 1) an aluminum cylinder; 2) inside a plastic bucket: 3) 2 revolutions around the outside of the container; 4) and electrodes located on both walls of a container. In one embodiment, the twin lead was wrapped around a bucket containing salt and the sensor was able to detect the salt level. In another related embodiment, the sensor was attached to the support structure inside a tank and the level reading was still generated. In these example embodiments, the oscillator frequencies ranged from about 4.47 MHz to about 4.54 MHz.

Figure 6:
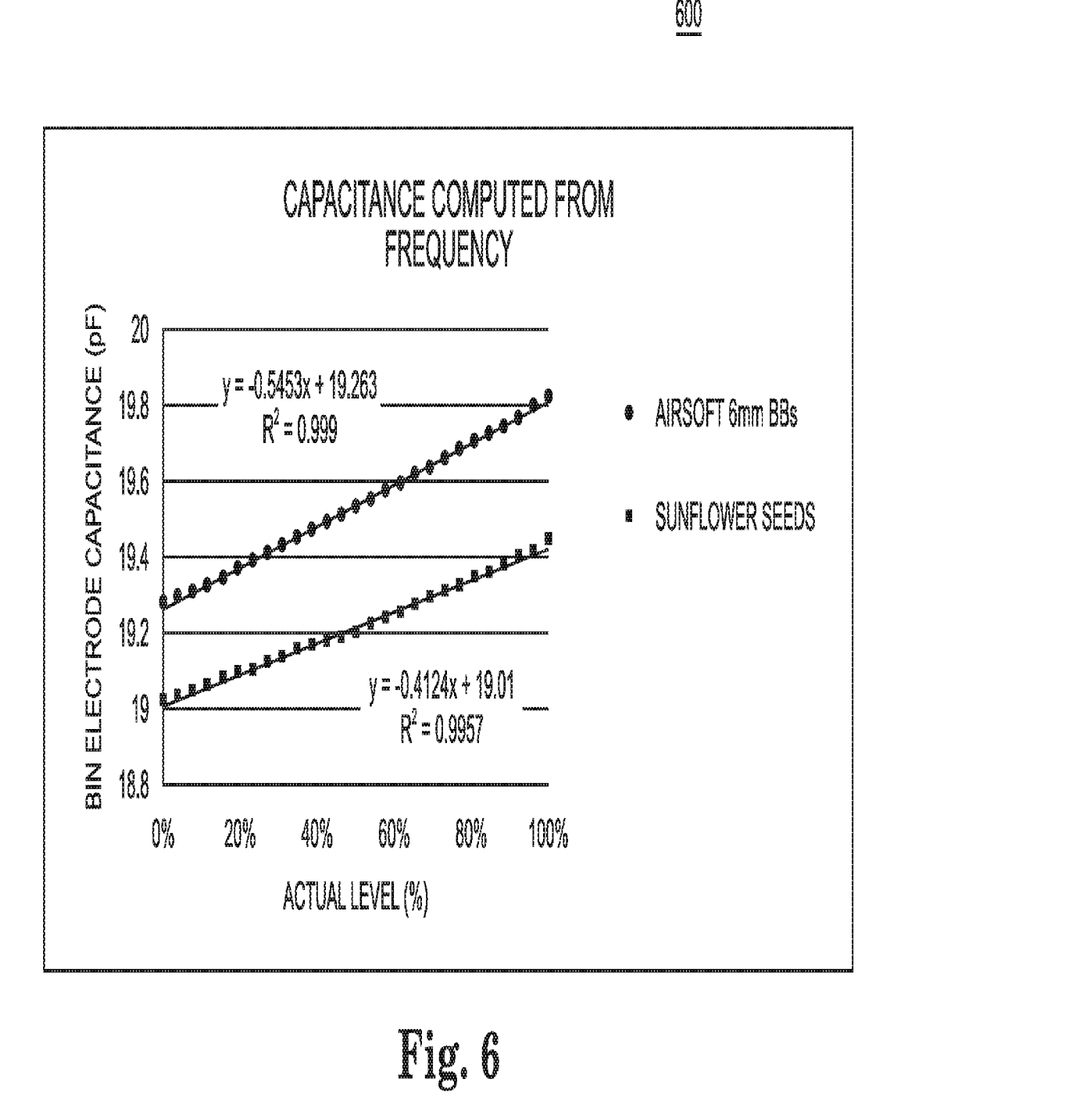
FIG. 6 illustrates a chart of oil type sunflower seeds and plastic 6 mm air gun pellets using a measured capacitance example sensor arrangement as taught herein.
Figure 7:
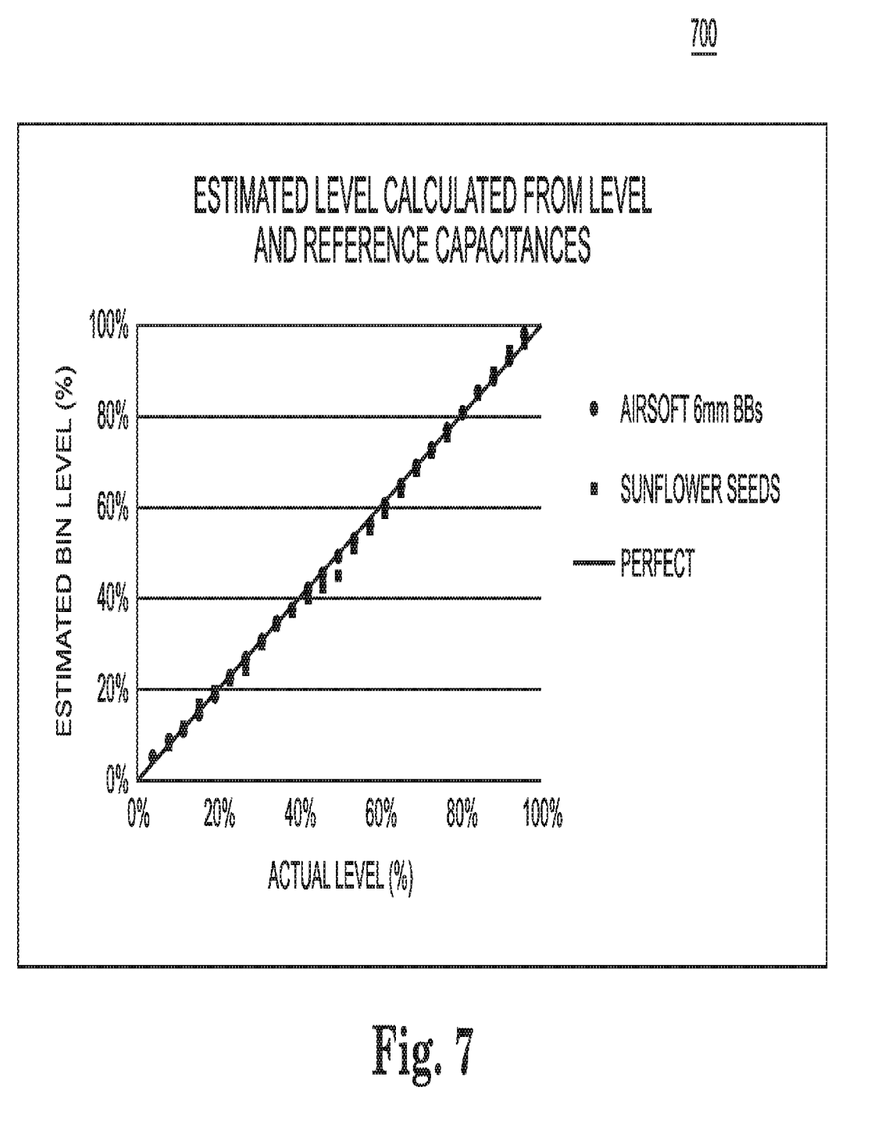
FIG. 7 illustrates a chart of the sunflower seeds and air gun pellets of FIG. 6 and an estimated fill level versus an actual level when a permittivity independent method is used as taught herein.
Figure 8:
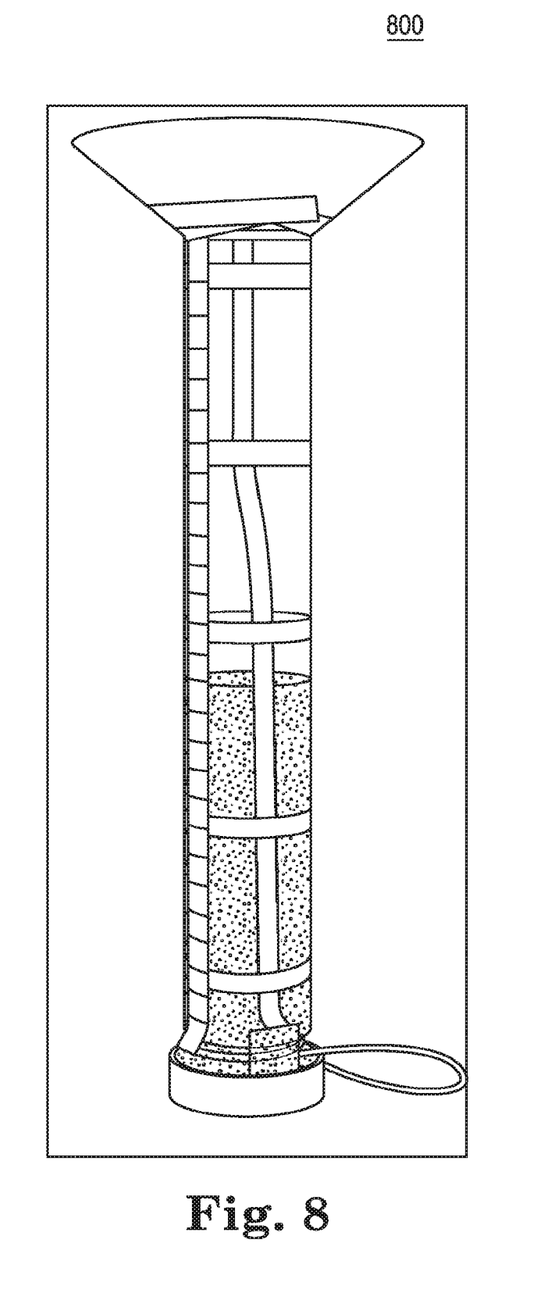
FIG. 8 illustrates a photograph of an example bin level measurement apparatus as taught herein.

Referring now to FIGS. 6-8, there are shown data plots for oil-type sunflower seeds versus airgun pellets using an apparatus shown in FIG. 8 according to the teachings herein. In particular, FIG. 8 illustrates a photograph of an example bin level measurement apparatus used to make capacitance measurements as the material level is varied in a 36" long acrylic tube with a 0.1" wall thickness. The electrodes, consisting of 300 Ohm twinlead transmission line, are attached to the outside of the tube. This "through the wall" measurement is intended to demonstrate the versatility of a capacitance measurement.

FIG. 6 illustrates a chart 600 of oil type sunflower seeds and plastic 6 mm air gun pellets using a measured capacitance example sensor arrangement as taught herein. The plotted data shows the measured capacitance from this apparatus versus the fill level for two different fill materials: oil type sunflower seeds and plastic 6 mm air gun pellets. Also shown in chart 600 are the linear fit equations for the capacitance measurements for both materials. These equations are the calibration expressions that would be used to estimate fill level from capacitance measurement. A well-known weakness of prior art single electrode level measurements is that the calibration curves are dependent on the fill material.

FIG. 7 illustrates a chart 700 of the sunflower seeds and air gun pellets of FIG. 6 and an estimated fill level versus an actual level when a permittivity independent method is used. In particular, chart 700 shows estimated fill level versus the actual level when a permittivity independent method is used from the ratio of level and reference capacitance measurements. As chart 700 shows, the single permittivity independent method exhibits highly accurate results for both the plastic pellets and the sunflower seeds. Further, with this method no material dependent calibration is required.

In one example embodiment, a level measurement system as taught herein the electrodes can be mounted either internal to any material container or external to a non-metallic material container with external mounting utilizing an active electrical shield to prevent biasing of the capacitance measurement by external influences such as rain or proximity of other materials.

In a related embodiment, a level measurement system as taught herein uses the multi-frequency capacitance measurements collected at different fill levels and can be mathematically manipulated so as to estimate the totally empty container capacitance enabling the sensor to be utilized in a single frequency mode for materials with permittivity that is independent of frequency. This single frequency mode taught herein circumvents the need for physical calibration measurements by using the multi-frequency level estimate as the known calibration point for the single frequency measurement.

The advantages of the various embodiments described herein include but are not limited to providing continuous level information in the form of a frequency output, an analog output, PWM signal, or digital; and providing discrete signals for particular levels (half full, ¾ full, etc.) and the output is linear. Because continuous level sensing is available, the system can also provide flow rate information by differentiating changes in the bin level. In a related embodiment, an active shield is included which removes unwanted external influences from the measurement.

The following patents that relate to capacitive sensors are herein incorporated by reference in their entirety and constitute part of the disclosure herein: U.S. Pat. No. 6,539,797 and 2006/0236275 to Breed.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

What is claimed is:

1. A method for calculating an empty container sensing electrode capacitance and an empty container reference electrode capacitance comprising:
    providing a sensing capacitive element configured from two parallel sensing electrodes positioned adjacent a container or vessel such that changes in a material level cause a proportionate change in a first capacitance of the sensing electrodes, wherein said sensing electrodes have a length LL and a nominal capacitance per unit length $C_0$ and wherein the capacitance of said sensing capacitive element varies in accordance both with the extent of the immersion of the parallel electrode in the fluid or material and a dielectric constant of the fluid or material;
    providing a reference capacitive element configured from two parallel reference electrodes positioned adjacent to a bottom of the container or vessel, said reference electrodes having a length LR and a capacitance per unit length $C_0$, and wherein the capacitance of said reference electrodes is a function of the dielectric constant of the fluid or material;
    measuring, at some first non-empty fill level (H1) at a first frequency (f1) a measured capacitance of the sensing element at the first frequency ($C_{tot@H1}$) and a measured capacitance of the reference element at the first frequency ($C_{ref@H1}$);
    measuring, at some second non-empty fill level (H2) differing from H1 by at least 10% at a second frequency (f2) a measured capacitance of the sensing element at the second frequency ($C_{tot@H2}$) and a measured capacitance of the reference element at the second frequency ($C_{ref@H2}$);
    generating the empty container reference electrode capacitance from a ratio of:
        a. a difference of the measured capacitance of the sensing element at the first frequency ($C_{tot@H1}$) and the measured capacitance of the sensing element at the second frequency ($C_{tot@H2}$) added to the product of H2/LR and the measured capacitance of the reference element at the second frequency ($C_{ref@H2}$) less the product of H1/LR and the measured capacitance of the reference element at the first frequency ($C_{ref@H1}$) as a numerator;
        b. a difference of H2/LR and H1/LR as a denominator;
    generating the empty container sensing electrode capacitance from a sum of the measured capacitance of the sensing element at the first frequency ($C_{tot@H1}$) and the product of H1/LR and the difference of the empty container reference electrode capacitance and the measured capacitance of the reference element at the first frequency ($C_{ref@H1}$).

2. The method according to claim 1 additionally comprising:
    determining a level of a fluid or material within the container by measuring a total capacitance of the sensing capacitive element and a total capacitance of the reference capacitive element; and
    generating the level of the fluid or material within the container from a product of:
    a ratio of LR (reference electrode length) and LL (sensing electrode length) and a ratio of:
        a. a difference of the measured total capacitance of the sensing capacitive element and the empty container sensing electrode capacitance as a numerator;
        b. a difference of the measured total capacitance of the reference capacitive element and the empty container reference electrode capacitance as a denominator.

3. The method according to claim 1 wherein the first frequency (f1) and the second frequency (f2) are the same.

4. The method according to claim 1 wherein the first frequency (f1) and the second frequency (f2) are different.

5. The method according to claim 1 wherein the second non-empty fill level (H2) differs from the first non-empty fill level (H1) by 10%-25%.

6. The method according to claim 1 wherein the sensing capacitive element and reference capacitive element are mounted internally to the container or vessel.

7. The method according to claim 1 wherein the container or vessel comprises plastic, glass, or fiberglass and wherein the sensing capacitive element and reference capacitive element are mounted externally to the container or vessel.

8. The method according to claim 7 wherein the sensing capacitive element and reference capacitive element are each covered by metal shield tape members.

* * * * *